(12) United States Patent
Bertilsson

(10) Patent No.: US 7,962,401 B2
(45) Date of Patent: Jun. 14, 2011

(54) MESSAGE CONSOLIDATION

(75) Inventor: Pär Olov Bertilsson, Bromma (SE)

(73) Assignee: Cinnober Financial Technology AB, Stockholm (SE)

( * ) Notice: Subject to any disclaimer, the term of this patent is extended or adjusted under 35 U.S.C. 154(b) by 961 days.

(21) Appl. No.: 10/925,151

(22) Filed: Aug. 25, 2004

(65) Prior Publication Data
US 2006/0047595 A1 Mar. 2, 2006

(30) Foreign Application Priority Data

Aug. 25, 2004 (SE) ...................................... 0402070

(51) Int. Cl.
G06Q 40/00 (2006.01)
(52) U.S. Cl. ........................................................ 705/37
(58) Field of Classification Search ...................... 705/37
See application file for complete search history.

(56) References Cited

U.S. PATENT DOCUMENTS

| 5,729,540 | A  | * | 3/1998 | Wegrzyn | 370/336 |
| 5,781,787 | A  | * | 7/1998 | Shafer et al. | 712/28 |
| 5,841,778 | A  | * | 11/1998 | Shaffer et al. | 370/447 |
| 6,078,959 | A  | * | 6/2000 | Wright et al. | 709/227 |
| 6,252,849 | B1 | * | 6/2001 | Rom et al. | 370/230 |
| 6,801,938 | B1 | * | 10/2004 | Bookman et al. | 709/224 |
| 7,020,678 | B1 | * | 3/2006 | Hubbard | 709/201 |
| 7,167,480 | B1 | * | 1/2007 | Somashekhar | 370/413 |
| 7,277,958 | B2 | * | 10/2007 | Chung et al. | 709/231 |
| 7,356,498 | B2 | * | 4/2008 | Kaminsky et al. | 705/37 |
| 2002/0042823 | A1 | | 4/2002 | DeBettencourt et al. | |
| 2002/0073016 | A1 | * | 6/2002 | Furbush et al. | 705/37 |
| 2002/0128945 | A1 | | 9/2002 | Moss et al. | |
| 2004/0205136 | A1 | * | 10/2004 | Whittenberger et al. | 709/206 |
| 2008/0082686 | A1 | * | 4/2008 | Schmidt et al. | 709/239 |

FOREIGN PATENT DOCUMENTS

WO WO 02/17559 A2 2/2002
WO WO 2004/044811 A1 5/2004

OTHER PUBLICATIONS

Anuradha et al.: StormCast—A cooperative caching system using GDSP algorithm, Apr. 2002, Dept. of Computer Science, Unversity of Kentucky, Lexington, KY, pp. 1-32.*
Cisco systems: White Paper on data center switching solutions, 1992-2006, pp. 1-15.*
European Search Report issued Dec. 15, 2005 in European Patent Application No. 05107768.3.

* cited by examiner

Primary Examiner — Alexander Kalinowski
Assistant Examiner — Bijendra K Shrestha
(74) Attorney, Agent, or Firm — Buchanan, Ingersoll & Rooney PC

(57) ABSTRACT

The invention relates to a method and a trading system for consolidating messages in intermediate server layers. It is operated in at least one of a data- and telecommunication network. Message distribution is introduced by collecting and distributing them through hold-back time frames, thereby, eliminating transactional overhead and achieving a substantial gain in message throughput time in the trading system.

4 Claims, 2 Drawing Sheets

MESSAGE CONSOLIDATION

TECHNICAL FIELD

The present invention pertains to a method and a system for consolidating messages in a trading system operated in at least one of a data- and telecommunication network.

BACKGROUND ART

An exchange or other financial institution or organization providing a market place for trading often provides its service using an electronic trading platform. Modern electronic trading systems are often implemented as a three tier layer model, comprising back-end servers, intermediate servers and trading applications.

The market participants connect to the exchange's trading platform utilizing a trading application which is either an application provided by the exchange or more often a proprietary application integrated with the participants internal systems.

Trading servers typically provide services such as processing order requests, order matching, trade capture, settlement and clearing. Very often all trading functionality is not kept in one server; but rather distributed over a set of physical servers.

The intermediate server layer handles the trading application connectivity. Received incoming request are dispatched to the appropriate back-end server depending on the request. The intermediate layer is also responsible for feeding updates of information back to trading applications.

In a typical message flow, the trading system receives updates from trading applications, applies these updates to the central servers, and then distributes the updates to all trading applications.

Participants in an electronic market are financial institutions like banks, broker firms and market maker firms. They either trade on behalf of a retail customer or for themselves, i.e., proprietary trading. The matching process is driven by the participants inserting orders and quotes into the "market". Orders are often inserted as a result of a retail user requesting a participant to act as intermediary.

Market makers have an obligation to "make a market", i.e., they will provide liquidity by almost always providing bids and offers. They change there prices in the market depending on their market belief and other market factors such as market news, their position and other underlying financial factors being changed.

A major challenge for all exchanges is to provide a well performing and reliable trading system. Each order and quote event requires a significant amount of processing steps to guarantee that the order or quote is processed in a secure, reliable and consistent manner. The overall problem is that incoming orders and quotes have to be received over the network, synchronized with the rest of the order flow, audit and recover logged etc.

SUMMARY OF THE INVENTION

The present invention describes how the matching processing of order and quote in an electronic market can be improved significantly by consolidation of orders and quote streams.

To achieve its aims and goals the present invention sets forth a method consolidating messages in a trading system operated in at least one of a data- and telecommunication network. Hereby the present invention comprises the following method steps:

the messages being consolidated at a consolidation point in a server layer, whereby the messages are collected in multiple concatenated predetermined hold-back time frames; and the messages consolidated in the time frames being transmitted for processing when a time frame has lapsed in time, thus eliminating transactional overhead and achieving a substantial gain in message processing throughput time in the trading system.

One embodiment of the present invention comprises multiple connected intermediate servers, each possessing the consolidation point.

In another embodiment the hold-back time frames are adaptive in respect of a threshold value for the intensity of message traffic to the server layer.

Yet another embodiment comprises that multiple server layers make up a tree like structure, where every layer off-loads the workload for a next layer in a distribution chain of messages before processing.

Furthermore, the present invention sets forth a trading system consolidating messages in at least one of a data- and telecommunication network. Thereby, the invention comprises:

a consolidation point for the messages in a server layer, whereby the messages are collected in multiple concatenated predetermined hold-back time frames; and a transmitter application, transmitting the messages consolidated in the time frames for processing when a time frame has lapsed in time, thus eliminating transactional overhead and achieving a substantial gain in message processing throughput time in the trading system.

The system of the present invention also provides the embodiments of the above method steps through its attached dependent claims.

BRIEF DESCRIPTION OF THE DRAWINGS

Henceforth the present invention is described together with the attached drawings for a better understanding of its embodiments and given examples, wherein.

DETAILED DESCRIPTION OF PREFERRED EMBODIMENTS

Order and quote flow consolidation is an aim and a goal of the present invention. Some exchange operations such as synchronization, receiving data over a network, safe storing information to a disk and the like operations have a relatively high fix resource cost, which is not linear to the amount of information processed. For example, writing data to a disk; most of the time is spent finding the place on disk where the information could be saved; the actual transferring of trade information thus has lost its importance, although being the main task.

If multiple orders and quotes in a trading application could be received as a single batch the processing cost per order and quote could be decreased due to the fact that the cost for some of the processing steps mentioned earlier are non linear. In order to consolidate the flows of orders and trades there must be a point of consolidation where incoming orders and quotes are batched. This could be accomplished at several places.

Figure 1:
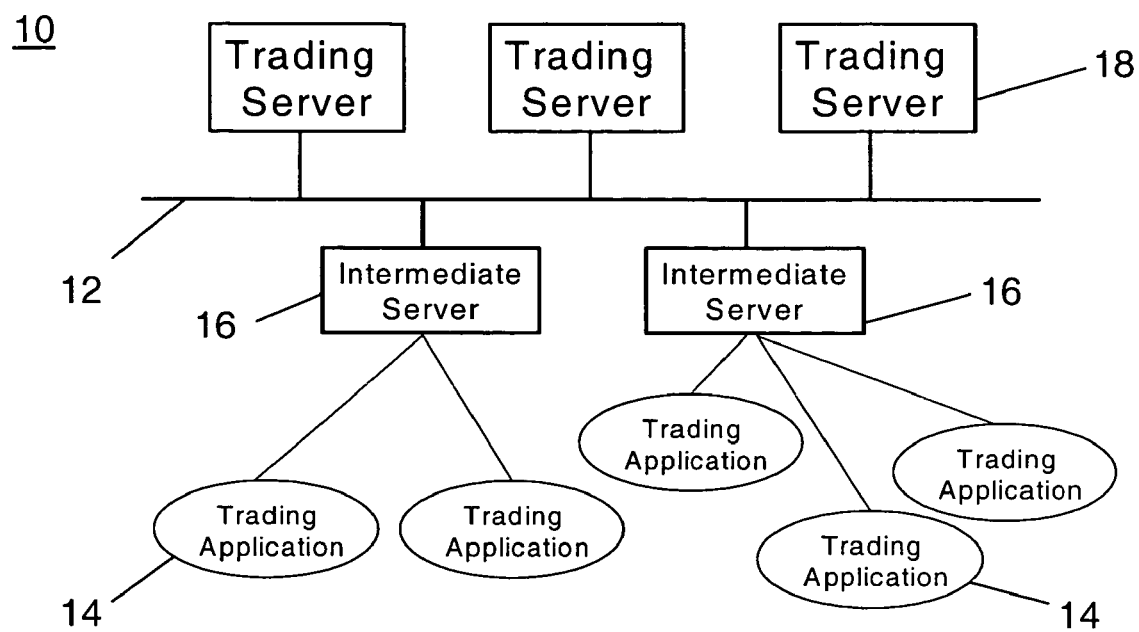
FIG. 1 is illustrating a conventional prior art trading system.

FIG. 1 illustrates a conventional prior art trading system 10, which can be modified to achieve the aims and goals of the present invention. The trading system 10 comprises a network 12 for data- and/or telecommunication where trading applications 14 transfer orders requests, order matching, trade captures, settlements, clearings and the like financial tasks. These transfers are received at the intermediate servers 16 for further transfer to a trading server 18.

An exchange or other financial institution providing a market place for trading often provides its service using an electronic trading platform. Modern electronic trading systems are often implemented as a three tier layer model: back-end servers, intermediate servers and trading applications.

Moreover, an exchange operates the back-end system and intermediate servers. Market participants connect to the exchange platform using a trading application which is either an application provided by the exchange or other financial institution or more often a proprietary application being integrated with the participants internal systems.

Trading servers typically provide services such as processing order requests, order matching, trade capture, settlement and clearing. Very often all trading functionality is not kept in one server; it is rather distributed over a set of physical servers.

An intermediate server layer handles the trading application connectivity. Received requests are dispatched to the appropriate back-end server depending on the request. The intermediate layer is also responsible for feeding updates of information back to trading applications.

In a typical message flow, the trading system receives updates from trading applications, applies these updates to the central servers, and then distributes the updates to all trading applications.

Market markers are participants in a system and they are obliged to provide a "market". The market makers ensure that the market is liquid i.e. that there is a buy and sell interest. There is some sort of economic incitement for market makers to make a market.

A simple approach would be to allow participants to submit multiple orders and quotes in a single request. This would reduce the number of transaction to a certain degree but the fact that the trading community is constituted of a large number of participants, the consolidation would be limited.

A more efficient place to perform a consolidation in accordance with the present invention would be to accomplish the consolidation at the intermediate server 16 layer. This since the order and quote at this layer are funneled together. According to the present invention the intermediate server applies a hold-back before sending an order or quote to a central matching process. If other orders and quotes would arrive to the intermediate server while the holdback is taken affect. These orders and quotes will be added to the order and quote batch.

Figure 2:
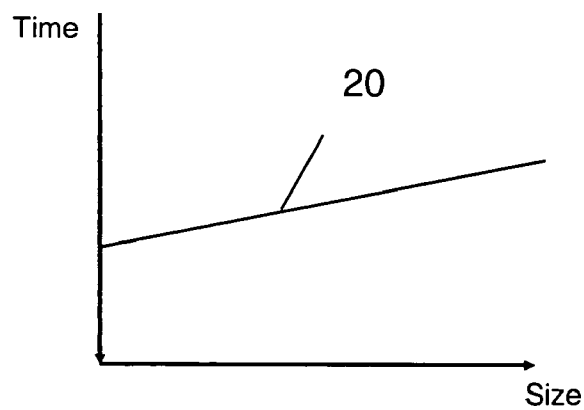
FIG. 2 is illustrating that a delay in distributing a batch consolidation in accordance with the present invention is directly linear to how efficient the batch would be.

In FIG. 2 it is schematically depicted in a diagram graph 20, with time on the x-axis and batch size on the y-axis that the price paid for consolidating orders and quotes are delayed before the orders and quotes get processed, since they are held back in order to build up batches of orders and quotes in accordance with the present invention. The delay is directly linear to the efficiency of the batching, the longer hold-back the better consolidation. Hence the present invention introduces a hold-back time frame, where a batch of incoming trading applications 14 is built up for transfer to a final matching process 40, see FIG. 3, When a hold-back timer count for a time frame is expired an entire order and quote batch is sent to the matching process 40, as one large single trading transaction.

With the approach consolidating the order and quote flow outside the trading server 18, the matching process reduces the workload in the matching process.

Figure 3:
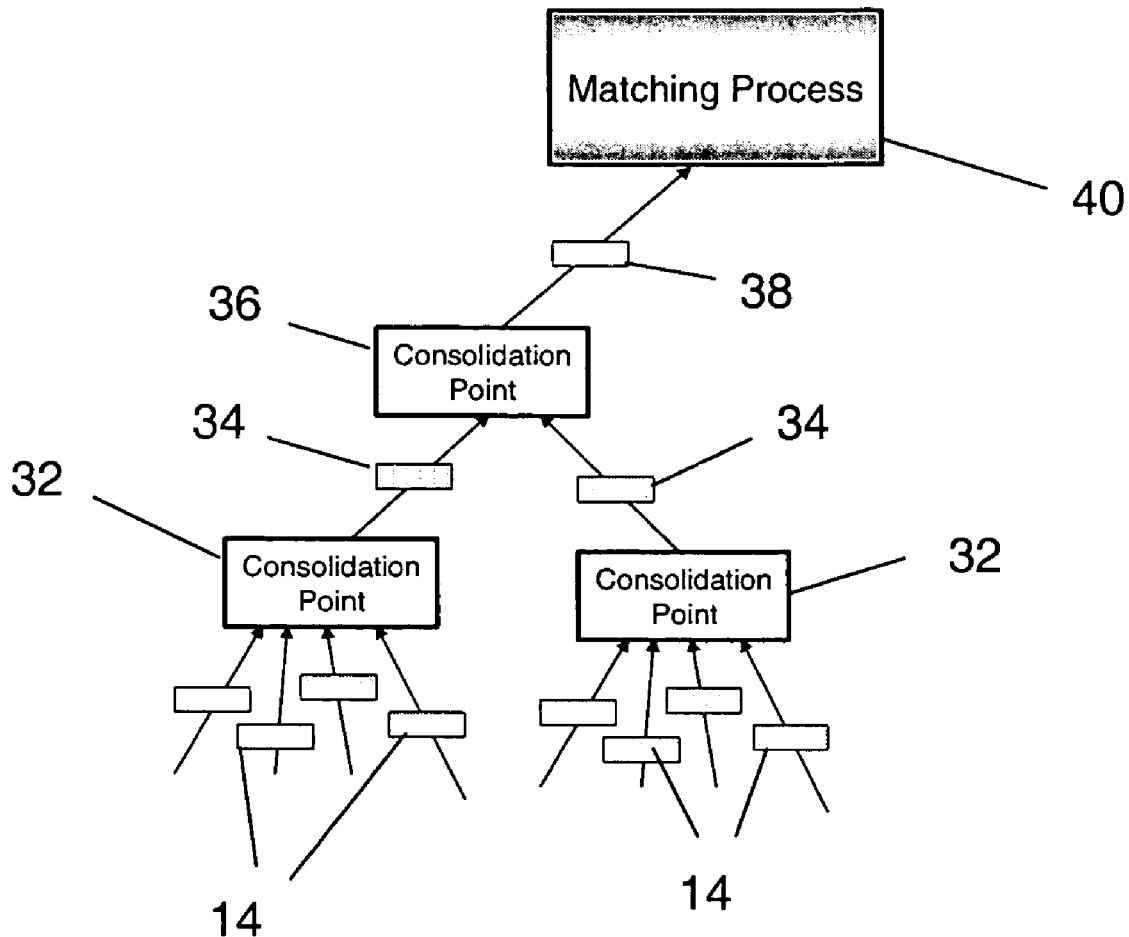
FIG. 3 is illustrating a tree like trading consolidation in accordance with one embodiment of the present invention.

Now with reference to FIG. 3 which schematically depicts a tree like configuration for a trading system 30 in accordance with the present invention. This system introduces several layers of consolidation points 32, 36, for example, residing in intermediate servers 16. Each layer of intermediate servers 16 consolidates and off loads the workload for the next layer.

In FIG. 3 messages from trading applications are transferred to a first consolidation point 32 in an intermediate server 16 at participants sites, where they are collected during the first interval of time and sent as batches 34 to the next consolidation point 36. At consolidation point 36, the batches 34 are consolidated in another batch 38 and sent to a matching process 40 for orders and quotes in for instance a trading server 18.

The price paid for consolidating orders and quotes are delays before an order and quote gets processed since they are held back in order to build up batches of orders and quotes.

The delay is directly linear to the efficiency of the batching, the longer hold-back the better consolidation as is depicted in FIG. 2. The factors to consider when determining the hold-back time frame, are that orders and quotes must not be held-back to the extent that their prices become obsolete, and that orders and quotes are processed within in a reasonable time from a participant perspective. The participant perception must be that orders and quotes are processed without delays. The hold-back must be set to a value that results in an efficient consolidation. The hold-back is adaptive in one embodiment of the present invention. If very few orders and quotes are processed there are no reasons to consolidate the flow, the matching process is able to handle the flow. In case the flow of orders increase, the hold-back time will increase to create a consolidation of the order and quote flow.

A predetermined threshold or several different threshold values for what is regarded from few to many orders and quotes makes up a basis for a dynamic and adaptive approach of setting first intervals of time through a hold-back-timer. The number of holdback-timers and levels in the tree like structure are dependent on a lot of parameters that are specific for every market place such as the number of members, order and quote flow rates, and other known parameters. There exists normally no dependency between consolidation points in different levels or between hold-back-timers.

From a matching perspective each consolidated 34, 38 batch is treated as one single transaction. The advantage is that the consolidated batch is read as a single message instead of several messages, the consolidated batch is written to audit and recovery file as a single transaction, and the locking in the matching processing is just done once for each batch instead of every order and quote.

From a consistency and reliability point of view, the matching process 40 handles the consolidated batch of orders and quotes as a single transaction. In case the matching process abnormally terminates all orders and quotes in the batch will be unprocessed or processed.

EXAMPLE

Assuming a matching process is processing 100 transactions per second. This implies that the time for processing a single transaction is 10 milliseconds. Assuming that the different steps in processing are divided into:

1) receiving over the network 0.5 ms
2) locking and synchronizing 0.05 ms
3) logging the transaction to the transaction log for recovery purpose 4.95 ms
4) processing the transaction 3 ms
5) broadcasting changes to prices caused by the transaction to the participant community 1 ms
6) send back response to the requestor of the transaction 0.5 ms If these 100 transactions are consolidated into one single transaction at a pre-consolidation point in accordance with the present invention the following optimization would be gained, the processing of each sub transaction would remain the same i.e. 3 ms. Steps 1, 2, 3, 5 and 6 would basically be just carried out one for each of the 100 sub transaction as they are treated as one single transaction. Assume a doubling of the efforts would result in 14 ms for all 100 sub transactions i.e. 0.14 ms per transaction. This implies an overall cost of 3.14 ms per transaction. A matching engine would then be able to process 318 transactions per second.

The present invention has been described through non limiting embodiments and examples, thus the attached set of claims define further embodiments of the invention to persons skilled in the art.

The invention claimed is:

1. A method for processing messages in a trading system operated in at least one of a data- and telecommunication network, comprising the following method steps:
    consolidating the messages at a consolidation point in a server layer by collecting the messages in multiple concatenated predetermined hold-back time frames;
    transmitting the messages collected in said hold-back time frames for processing when a hold-back time of said hold-back time frames has lapsed in time, thus eliminating transactional overhead and achieving a substantial gain in message processing throughput time in said trading system, wherein said hold-back time of said hold-back time frames is increased in response to an increase in the intensity of message traffic to said server layer and said hold-back time of said hold-back time frames is decreased in response to a decrease in the intensity of message traffic to said server layer; and
    wherein the multiple connected intermediate servers make up a tree like structure, where the consolidation point of each intermediate server off-loads the workload for a next consolidation point in another intermediate server in a distribution chain of messages before processing.

2. The method according to claim 1, wherein the trading system includes multiple connected intermediate servers, each intermediate server including said consolidation point.

3. A trading system that processes messages in at least one of a data- and telecommunication network, comprising:
    at least one intermediate server having a consolidation point for said messages in a server layer, said intermediate server being configured to collect said messages in multiple concatenated predetermined hold-back time frames at said consolidation point,
    said at least one intermediate server having means for executing a transmitter application to transmit said messages collected in said hold-back time frames and to process when a hold-back time of said hold-back time frames has lapsed in time, thus eliminating transactional overhead and achieving a substantial gain in message processing throughput time in said trading system, wherein said hold-back time of said hold-back time frames is increased in response to an increase in the intensity of message traffic to said server layer and said hold-back time of said hold-back time frames is decreased in response to a decrease in the intensity of message traffic to said server layer; and
    wherein the multiple connected intermediate servers make up a tree like structure, where the consolidation point of each intermediate server off-loads the workload for a next consolidation point in another intermediate server in a distribution chain of messages before processing.

4. The system according to claim 3, comprising multiple connected intermediate servers, each intermediate server including said consolidation point.

\* \* \* \* \*